Feb. 2, 1960 J. B. SCHULTZ 2,923,816
AUTOMATIC GAIN CONTROL WITH VARIABLE RESISTANCE DEVICE IN ANTENNA CIRCUIT
Filed Dec. 28, 1956
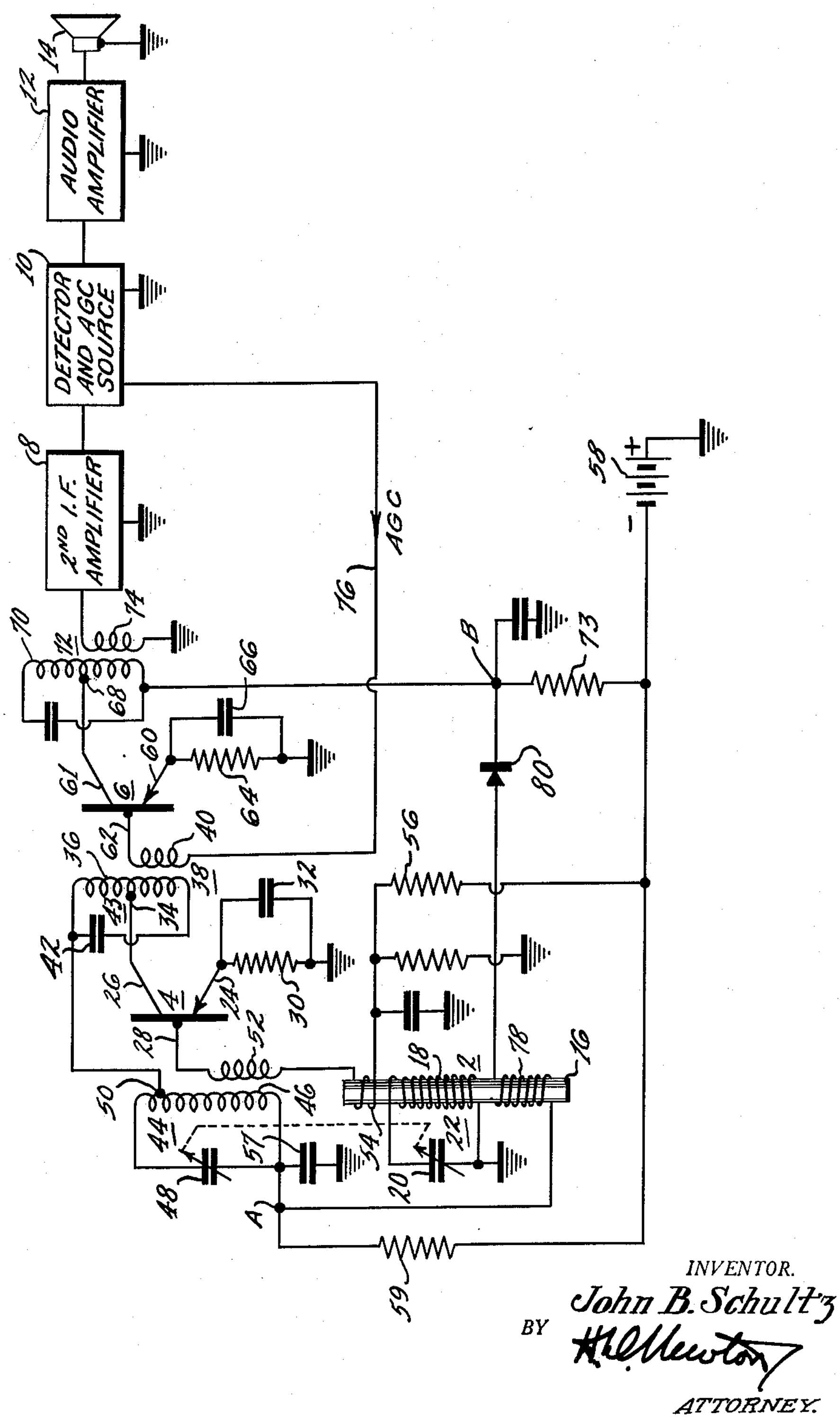
INVENTOR.
John B. Schultz
BY H. L. Newton
ATTORNEY.

United States Patent Office 2,923,816
Patented Feb. 2, 1960

2,923,816

AUTOMATIC GAIN CONTROL WITH VARIABLE RESISTANCE DEVICE IN ANTENNA CIRCUIT

John B. Schultz, Glenolden, Pa., assignor to Radio Corporation of America, a corporation of Delaware Application December 28, 1956, Serial No. 631,117
9 Claims. (Cl. 250—20)

This invention relates to signal receiving systems, and in particular to radio signal receivers utilizing transistors as the signal translating elements thereof.

It is the object of the present invention to provide improved circuit means for preventing the overloading of a radio receiver, particularly of the type employing transistors, and to enable satisfactory operation without appreciable distortion despite the reception of very strong signals.

Signal overloading of a transistor radio receiver is prevented, in accordance with the invention, by controlling the efficiency of the receiver antenna in response to signal strength variations by means of a variable resistance element such as a crystal diode. The antenna may, for example, be of the loop type employing a ferrite rod having an antenna winding thereon, as is well known. A separate or auxiliary winding is provided on the rod and the diode is connected in series with this winding. The diode is connected in the receiver such that it is normally biased in the reverse direction and is nonconductive, but is forward biased and conducts when the amplitude of the received signal reaches a predetermined amplitude. The resistance of the diode then decreases, thereby decreasing the shunt resistance and the Q of the antenna tuned circuit, and its efficiency. By controlling the efficiency of the antenna in accordance with signal strength, overloading of the receiver is prevented.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which the single figure is a schematic circuit diagram, partially in block diagram form, of a signal receiving system embodying the invention.

Referring now to the drawing, a signal receiving system of the superheterodyne type includes an antenna 2, a converter transistor 4, a first intermediate frequency (I.F.) amplifier 6, a second I.F. amplifier 8, a second detector and automatic gain control (A.G.C.) source 10, an audio amplifier 12 and a loudspeaker 14. The antenna 2 is of the loop type and includes an elongated ferrite rod or core 16, upon which is wound an antenna or signal pickup winding 18 which may comprise several hundred turns of fine copper wire. The antenna or input winding 18 is shunted by a variable tuning capacitor 20 and provides therewith a tunable antenna input or signal pickup circuit 22 for the receiver.

The converter transistor 4 may be considered to be of the P-N-P junction type and includes an emitter electrode 24, a collector electrode 26, and a base electrode 28. The emitter 24 is connected to a point of reference potential or chassis ground through a degenerative stabilizing resistor 30, which is by-passed for signal frequencies by a shunt by-pass capacitor 32. The collector 26 of the converter transistor 4 is connected to a tap 34 on a primary winding 36 of an output coupling transformer 38, which also includes a secondary winding 40. The primary winding is shunted by a capacitor 42 and provides therewith a tuned output circuit 43 for the converter transistor 4.

A tunable oscillator circuit 44 for the converter transistor 4 includes an inductor 46 and a variable tuning capacitor 48. To provide feedback of proper phase and magnitude for sustained oscillations, a connection is provided from the converter output circuit 43 to a tap 50 on the oscillator tuned circuit inductor 46. The oscillator tuned circuit inductor 46 is in inductive coupling relation with an inductor 52, one terminal of which is connected directly with the base 28. Signals are thus fed back from the collector 26 of the transistor 4 to the base 28, of proper phase and magnitude, to generate a local oscillator signal.

To couple a received modulated carrier wave signal to the base 28 of the converter transistor 4 for mixing or heterodyning with the generated local oscillator signal, and to provide base biasing voltages for the converter transistor 4, the base 28 is connected through the inductor 52, a coupling winding 54 on the antenna 2, and a coupling resistor 56, to the negative terminal of a direct-current supply source, illustrated as a battery 58, of which the positive terminal is connected to chassis ground as indicated. The received signal is coupled through the antenna coupling winding 54 and the inductor 52 to the base 28 of the converter transistor 4 and is heterodyned or mixed with the local oscillator signal to provide an intermediate frequency signal at the collector 26. Collector biasing voltages for the converter transistor 4 are provided by connecting the negative terminal of the battery 58 through a D.C. path that may be traced through a decoupling resistor 59, the lower half of the oscillator inductor 46, the tap 50, the upper half of the winding 36 of the output transformer 38, and the tap 34 to the collector 26. The junction of the resistor 59 and the oscillator inductor 46 is by-passed to ground by a capacitor 57 as indicated.

The intermediate frequency signal is applied through the secondary winding 40 of the output transformer 38 to the base 62 of the first I.F. amplifier transistor 6. The transistor 6 may also be considered to be of the P-N-P junction type and includes an emitter 60 and a collector 61 in addition to the base 62. The emitter 60 is connected to ground through a degenerative stabilizing resistor 64, which is by-passed for signal frequencies by a by-pass capacitor 66. The collector 61 is connected to a tap 68 on a primary winding 70 of an output transformer 72, which also includes a secondary winding 74. The collector 61 is also connected through the lower half of the primary winding 70 and a suitably by-passed resistor 73, to the negative terminal of the battery 58. The secondary winding 74 is connected with the input circuit of second I.F. amplifier, the output circuit of which is connected with the input circuit of the second detector and A.G.C. source 10 as indicated.

The second detector and A.G.C. source 10 may be of any convenient type and is operative to develop an A.G.C. voltage in accordance with variations in signal strength. The A.G.C. voltage, which increases with increases in amplitude of the signal applied to the second detector 10, is applied through the A.G.C. lead 76 and the secondary winding 40 to the base 62 of the first I.F. amplifier transistor 6. Accordingly, as the amplitude of the signal which is applied to the second detector 10 increases, the A.G.C. voltage which is applied to the base 62 becomes less negative (i.e. more positive) to decrease the gain of the transistor 6.

The output circuit of the second detector and A.G.C. source 10 is connected to the usual audio amplifier 12 and loudspeaker 14.

To complete the receiver circuit and to prevent overloading, in accordance with the invention, an auxiliary or control winding 78 is provided on the antenna ferrite rod and connected in series with a unilateral conducting device such as a crystal diode 80. The control winding is in close magnetic coupling relation with the signal pickup winding 18 and may comprise approximately 40 turns of thin copper wire. The auxiliary winding and the diode are connected in series between two points in the receiver circuit such that the voltage across the diode 80 varies as the amplitude of the received signal varies. To this end, the auxiliary winding 78 and the diode 80 are connected from the junction of the resistor 79 and the low signal voltage end of the oscillator tuned circuit 44 (point A) to the junction of the resistor 73 and the low signal voltage end of the first I.F. tuned output circuit (point B).

The values for the circuit components are chosen so that in the absence of a signal of sufficient amplitude to cause the application of an A.G.C. voltage to the first I.F. amplifier transistor 6, the voltage at point A is slightly more negative than the voltage at point B. In a typical example, and for circuit component values as given hereinafter, the voltage at point A may be 7.5 volts negative and the voltage at point B may be 7.0 volts negative. Thus there is one-half volt drop across the diode 80. This voltage is of a polarity to bias the diode 80 in the reverse direction. In the absence of strong signals, therefore, the diode 80 is non-conductive and has no effect on the operation of the receiver.

In the presence of a strong signal, however, an A.G.C. voltage is applied to the base 62 of the first I.F. amplifier transistor 6. This voltage is of a polarity to reduce the gain of the transistor 6. Accordingly, the collector current of the transistor 6, which flows out of the collector 61, is reduced, reducing the current flow through the resistor 73. The point B, therefore, becomes more negative and in a typical example may be 8.0 volts negative. The voltage at point B is, therefore, more negative than the voltage at point A and the voltage across the diode 80 is in a direction to bias the diode 80 in the forward or conducting direction. The diode 80 will then conduct in the forward direction. This will reduce the resistance of the diode 80, which is in series with the antenna auxiliary winding 18. By reducing the resistance in series with the control or auxiliary winding 18, the effective shunt resistance across the antenna tuned circuit 22 is decreased through the coupling between the auxiliary winding and the signal pickup winding. Since the Q of the antenna tuned circuit 22 decreases with decreases of the shunt resistance, the Q and thus the efficiency of the antenna circuit are reduced under strong signal conditions. Accordingly, overload of the receiver is prevented and the receiver will operate satisfactorily at 10 to 20 times the signal strength which would ordinarily cause overload.

The following circuit component values, which are given by way of example, provide the desired operating characteristics and prevent overload:

| | |
|---|---|
| Resistors 30; 56; 59; 64; and 73 | 3,300; 12,000; 1,500; 2,700; and 4,700 ohms, respectively. |
| Capacitors 32 and 66 | 0.1 microfarad each. |
| Battery 58 | 9 volts. |
| Diode 80 | Commercial type 1N295. |
| Transistor 4 | Commercial type 2N140. |
| Transistor 6 | Commercial type 2N139. |

By controlling the efficiency of the antenna of a radio receiver, according to the invention, overload of the receiver is prevented. Thus, use of the invention permits satisfactory operation of a radio signal receiver under strong signal conditions.

What is claimed is:

1. In a signal receiving system, the combination comprising, antenna means having a signal pickup coil, a tunable signal input circuit for receiving a modulated carrier wave signal including said coil, an auxiliary winding coupled with said coil, a normally reverse biased unilateral conducting device connected with said auxiliary winding and between two points in said receiving system, and means for varying the voltage between said two points in response to amplitude variations of a received carrier wave signal to bias said unilateral conducting device in the forward direction and reduce the efficiency of said antenna through said auxiliary winding for preventing overload of said receiving system under relatively strong signal conditions.

2. A signal receiving system comprising in combination, a loop antenna including an antenna core rod, tunable signal input circuit means for receiving a modulated carrier wave signal including an inductive signal pickup winding on said rod, a signal converter stage including a transistor, means for generating a local oscillator signal including a tunable oscillator circuit coupled with said transistor, a coupling winding supported on said rod and coupled with said transistor for applying a received carrier wave signal thereto, a signal amplifier including a transistor having an output circuit, an auxiliary winding supported on said rod in coupling relation with said pickup winding, means connecting one end of said auxiliary winding with said oscillator circuit, a unilateral conducting overload control device, means connecting the other end of said auxiliary winding with said control device, direct-current conductive means connecting said control device to a variable bias voltage supply point on the output circuit of said signal amplifier, and means for applying an automatic gain control signal to said signal amplifier to control the gain and output current thereof inversely with the strength of said carrier wave signal and provide a forward bias for said control device to reduce the efficiency of said antenna and prevent overload of said receiving system under relatively strong signal conditions.

3. A signal receiving system comprising, in combination, an antenna including an antenna core rod and an inductive signal pickup winding on said rod, a signal input circuit for receiving a carrier wave signal including said pickup winding, a signal converter stage including a transistor, feedback circuit means coupled with said transistor for generating a local oscillator signal, a coupling winding on said rod and coupled with said transistor for applying a received carrier wave signal thereto, a signal amplifier including a transistor and having a signal output circuit, an auxiliary winding on said rod in coupling relation with said pickup winding, means connecting one end of said auxiliary winding with said feedback circuit means, a unilateral conducting overload control device, means connecting the other end of said auxiliary winding with said control device, means connecting said control device with said output circuit, and means for applying an automatic gain control signal to said amplifier transistor to control the gain and output current thereof in accordance with variations in the strength of said carrier wave signal and to vary the bias for said control device to reduce the efficiency of said antenna and prevent overload of said receiving system under relatively strong signal conditions.

4. In a signal receiving system, the combination comprising, an antenna for receiving an input signal, means providing an auxiliary control winding for said antenna, a variable resistance device connected with said winding, said variable resistance device being of relatively high resistance for the reception of signals below a predetermined amplitude, and means responsive to signals above said predetermined amplitude to decrease the resistance of said device to reduce the efficiency of said antenna and prevent overload of said receiving system under relatively strong signal conditions.

5. In a signal receiving system, the combination comprising, tunable input circuit means for receiving a modulated carrier wave signal including a loop antenna and an auxiliary control winding coupled thereto, a unilateral conducting device connected as a variable control means in series with said winding and between two bias voltage supply points in said receiving system, means providing a bias voltage between said two points of a polarity to bias said unilateral conducting device in the reverse direction in the absence of carrier wave signals of predetermined amplitude, and means for varying the voltage between said two points in response to amplitude variations of received signals to bias said unilateral conducting device in the forward direction and control the efficiency of said antenna for preventing overload of said receiving system in the presence of carrier wave signals above said predetermined amplitude.

6. A signal receiving system comprising, in combination, a loop antenna including a ferrite core rod, means providing a tunable antenna circuit for receiving a modulated carrier wave signal, said circuit including an inductive pickup winding on said rod, a converter stage including a transistor having base, emitter, and collector electrodes, means providing a signal output circuit coupled with said collector electrode, means providing regenerative feedback between said collector and base electrodes for generating a local oscillator signal and including a tunable oscillator circuit coupled with the base electrode of said transistor, an inductive coupling winding on said rod and connected with said base electrode for applying said carrier wave signal thereto for heterodyning with said local oscillator signal to provide an intermediate frequency signal, an intermediate frequency signal amplifier coupled to said converter stage and including a transistor having base, emitter, and collector electrodes, means providing a signal output circuit coupled with the collector electrode of said signal amplifier transistor, an auxiliary winding coupled with said pickup winding on said rod, and including a pair of terminals, means connecting one of said terminals with said oscillator circuit, a unilateral conducting overload control device, means connecting the other of said terminals with said control device, direct-current conductive means connecting said control device to the output circuit of said signal amplifier transistor, and means for applying an automatic gain control volatge to said signal amplifier transistor to control the gain and collector current thereof inversely with the strength of said carrier wave signal thereby to vary the voltage at said output circuit in magnitude and polarity to forward bais said control device and reduce the efficiency of said antenna for preventing overload of said receiving system under relatively strong signal conditions.

7. A signal receiving system comprising, in combination, an antenna of the loop type including a signal pickup winding and a magnetic core element therefor, means providing a signal input circuit for receiving carrier wave signals, said pickup winding being connected in said circuit, a converter stage including a signal translating device connected for generating a local oscillator signal, a coupling winding on said core element connected in circuit with said signal translating device for applying a received carrier wave signal thereto, a signal amplifying device coupled to said converter stage and having a signal output circuit, an auxiliary winding on said core element in coupling relation to said pickup winding, means connecting one end of said auxiliary winding to a point in said converter stage, a unilateral conducting overload control device connected to the other end of said auxiliary winding, means connecting said control device to a variable voltage point on the output circuit of said signal amplifying device, and means for applying a gain control signal to said signal amplifying device to control the gain and output current thereof inversely with the strength of said carrier wave signal and provide a forward bias for said control device thereby to reduce the efficiency of said antenna and prevent overload of said receiving system under relatively strong signal conditions.

8. In a transistorized signal receiving system, the combination comprising, means providing a tunable input circuit for receiving a carrier wave signal including a loop antenna and an auxiliary winding coupled thereto, means including a transistor for generating a local oscillator signal and converting said carrier wave signal to an intermediate frequency signal, means including a signal amplifying transistor for amplifying said intermediate frequency signal, means providing an output circuit for said signal amplifying transistor, a unilateral conducting device connected in series between said winding and a point on said output circuit, and means for varying the gain and output current flow of said signal amplifying transistor in response to carrier wave signals above a predetermined amplitude to bias said unilateral conducting device in the forward direction and reduce the efficiency of said antenna through said auxiliary winding for preventing overload of said receiving system under relatively strong signal conditions.

9. A radio signal receiver comprising, in combination, an antenna circuit including a signal pickup winding for receiving a carrier wave signal, an auxiliary winding for said antenna circuit, a converter stage including a transistor connected to generate a local oscillator signal, means in said antenna circuit for coupling said received carrier wave signal to said transistor for heterodyning with said local oscillator signal to develop an intermediate frequency signal, an intermediate frequency signal amplifier transistor having base, emitter, and collector electrodes, signal coupling means connected for applying said intermediate frequency signal to said base electrode, means providing a direct-current supply source, means including a tuned output circuit and a resistive impedance element connecting said collector electrode with said supply source, means connecting said supply source with a voltage reference point in said converter stage, means connecting one end of said auxiliary winding with said point, a unilateral conducting device connected from the other end of said auxiliary winding to the junction of said output circuit and said resistive impedance element, and gain control means for varying the gain of said signal amplifier transistor in response to carrier wave signals above a predetermined amplitude to vary the collector current flow of said amplifier transistor and the voltage drop across said impedance element thereby to bias said unilateral conducting device in the forward direction and reduce the efficiency of said antenna circuit under relatively strong signal conditions.

References Cited in the file of this patent

UNITED STATES PATENTS

| | | |
|---|---|---|
| 2,104,087 | Linsell | Jan. 4, 1938 |
| 2,112,595 | Farnham | Mar. 29, 1938 |
| 2,581,202 | Post | Jan. 1, 1952 |
| 2,774,866 | Burger | Dec. 18, 1956 |

FOREIGN PATENTS

| | | |
|---|---|---|
| 414,187 | Great Britain | Aug. 2, 1934 |